United States Patent
Martin-Cocher et al.

(10) Patent No.: US 8,260,351 B2
(45) Date of Patent: Sep. 4, 2012

(54) SYSTEM AND METHOD FOR SELECTIVE STORAGE OF MOBILE CODE AND RESOLVED CONTENT THEREFROM

(75) Inventors: Gaelle Martin-Cocher, Mississauga (CA); Clara Severino, Mississauga (CA)

(73) Assignee: Research In Motion Limited, Waterloo, Ontario (CA)

( * ) Notice: Subject to any disclaimer, the term of this patent is extended or adjusted under 35 U.S.C. 154(b) by 540 days.

(21) Appl. No.: 12/487,842

(22) Filed: Jun. 19, 2009

(65) Prior Publication Data

US 2010/0261502 A1 Oct. 14, 2010

Related U.S. Application Data

(60) Provisional application No. 61/168,450, filed on Apr. 10, 2009.

(51) Int. Cl.
*H04M 1/00* (2006.01)
(52) U.S. Cl. .................. 455/556.1; 455/412.1
(58) Field of Classification Search ............. 379/202.01; 455/566, 564, 556, 556.1, 412.1; 705/347
See application file for complete search history.

(56) References Cited

U.S. PATENT DOCUMENTS

| | | | |
|---|---|---|---|
| 5,227,617 | A | 7/1993 | Christopher et al. |
| 6,732,933 | B2 | 5/2004 | Waxelbaum |
| 2003/0173405 | A1 | 9/2003 | Wilz, Sr. et al. |
| 2004/0112958 | A1 | 6/2004 | Rosica |
| 2009/0041353 | A1 | 2/2009 | Hoff et al. |
| 2010/0250463 | A1* | 9/2010 | O'Rourke et al. ............ 705/347 |

OTHER PUBLICATIONS

PCT International Search Report; PCT Application No. PCT/CA2009/000853; Dec. 7, 2009; 3 pgs.
PCT Written Opinion of the International Searching Authority; PCT Application No. PCT/CA2009/000853; Dec. 7, 2009; 6 pgs.
Open Mobile Alliance; Title: White Paper on Mobile Codes; OMA-WP-MobileCodes-20081024-A; Oct. 24, 2008; 26 pgs.
CTIA Wireless Internet Caucus; Title: Camera-Phone Based Barcode Scanning; CTIA Code Scan Action Team; White Paper; Sep. 9, 2008; 27 pgs.

* cited by examiner

*Primary Examiner* — Phuoc Doan
(74) *Attorney, Agent, or Firm* — Conley Rose, P.C.; J. Robert Brown, Jr.

(57) ABSTRACT

A method is provided for storing mobile code-related data on a mobile device. The method includes a mobile code reader processing a mobile code, wherein storage-related data derived from the mobile code specifies whether at least a portion of the mobile code-related data is allowed to be stored. The method further includes the mobile device selectively storing the at least a portion of the mobile code-related data based on the storage-related data.

22 Claims, 4 Drawing Sheets

SYSTEM AND METHOD FOR SELECTIVE STORAGE OF MOBILE CODE AND RESOLVED CONTENT THEREFROM

CROSS-REFERENCE TO RELATED APPLICATIONS

The present application claims priority to U.S. provisional patent application No. 61/168,450, filed Apr. 10, 2009, by Gaelle Martin-Cocher, et al, entitled "System and Method for Selective Storage of Mobile Code and Resolved Content Therefrom", which is incorporated by reference herein as if reproduced in its entirety.

BACKGROUND

Barcode readers have recently been added as a feature to some mobile telecommunications devices such as mobile telephones. The camera on the mobile device, or a similar component on the device with scanning capabilities, can capture an image of a barcode. Software on the device can then decode the barcode into usable data. The hardware that captures the image and the software that resolves the image into data can collectively be referred to as the barcode reader. A barcode that can be or has been scanned by a barcode reader on a mobile device can be referred to as a mobile code.

Barcodes can be classified as either one-dimensional (1D) or two-dimensional (2D). A one-dimensional barcode consists of a series of parallel bars and spaces of varying widths, arranged along a baseline, in which data is encoded. Two-dimensional barcodes use both the vertical and horizontal components to hold data. 2D barcodes can be separated into two types—stacked and matrix codes. Stacked barcodes consist of several lines of bars and spaces, one above another in the barcode symbol. Matrix barcodes consist of blocks of data cells, typically constructed from polygons, along with a characteristic orientation symbol. Other barcode solutions exist based on other schemes such as the Microsoft High Capacity Color Barcode. In any of these cases, the method of representing data (e.g., digits, characters) in the barcode, that is, the barcode encoding scheme, can be referred to as its symbology. The visual appearance of a barcode can be referred to as its symbol or image. The data encoded in a barcode follows one of several standardized data formats. For example, 1D barcodes typically comply with the EAN-13 symbology standard.

Mobile codes can be classified according to the mode by which a symbology is resolved into data and whether the data is in a form that can be used by a mobile device without further processing. The direct mode of symbology resolution is performed entirely within the reader. That is, a barcode reader scans a mobile code and resolves the symbology into a form that needs no further decoding to retrieve the resolved content. In some cases, the resolved content might be directly available to a mobile device that includes the barcode reader. For example, a barcode reader on a mobile device might scan a mobile code printed on a business card. The contact information encoded in the mobile code might then appear as a contact entry on the screen of the mobile device. That is to say, the barcode reader may communicate contact information, which is resolved from the symbology, to an address book or other personal information management (PIM) type client application on the mobile device where the contact information is populated into fields of a contact template for display, editing and, ultimately, storage to a data structure resident in the mobile device or elsewhere (e.g., in a network operator's server, in a Converged Address Book (CAB) defined by the Open Mobile Alliance, etc.). In other cases, the resolved content might be a Uniform Resource Identifier (URI) or some other type of network address. A mobile device that reads such a mobile code might connect to the service or network location specified by the URI, for example when the barcode reader communicates the URI (or the like) to a web browser application on the mobile device.

In the indirect mode of symbology resolution, a barcode reader resolves a mobile code locally into an identifier that can be referred to as the indirect code identifier or ICI. The mobile device that includes the barcode reader then sends the ICI to a network element such as a server. The network element then uses the ICI to determine the data that is to be returned to the mobile device. That is, in the indirect mode, the resolved content in the form of the ICI is further processed by the network element in order to be converted into data that is usable by the mobile device. It is to be noted that the network element receiving the ICI may retrieve the data corresponding to this ICI from another network element. In some cases, the network element returns data (e.g., an image, a coupon, a URI, a vCard, a text message or SMS, multimedia message (MMS), etc.) that might be displayed on the screen of the mobile device. In other cases, the network element returns a URI or other network address, and the mobile device connects to the service or network location specified by the URI.

As used herein, the term "mobile device" might in some cases refer to portable devices such as mobile telephones, personal digital assistants, handheld or laptop computers, and similar devices that have telecommunications capabilities and an integrated barcode reader. In other cases, the term "mobile device" might refer to devices that have similar capabilities but that are not transportable, such as fixed line telephones, desktop computers, or set-top boxes. Such non-transportable devices might have access to a barcode reader that is not necessarily integrated or unitary with the device.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
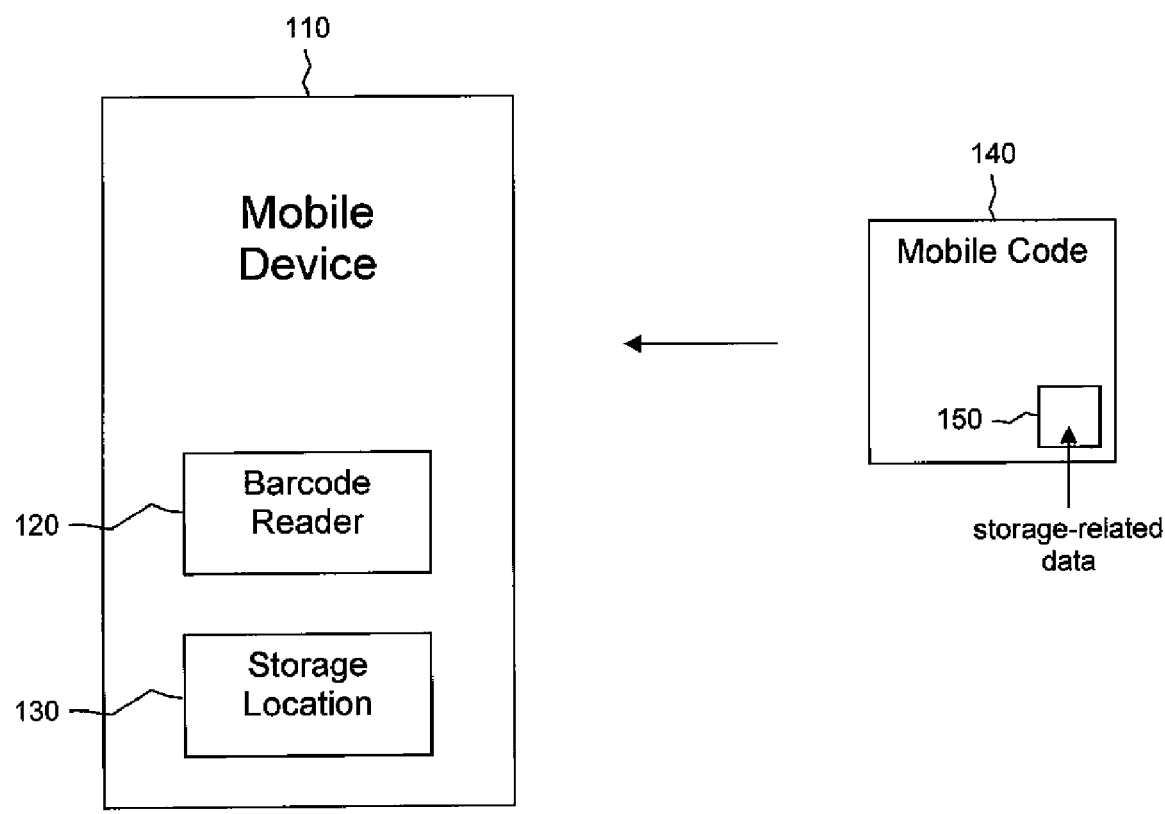
FIG. 1 is a diagram of a mobile device and a mobile code according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the example designs and implementations illustrated and described herein, but may be modified within the scope of the appended claims along with their full scope of equivalents.

In an embodiment, a mobile device is provided with the capability to store an image of a mobile code and/or resolved content derived from the image of the mobile code. The resolved content might be data in a form that can be used by the mobile device without further processing; might be an ICI that can be transmitted to a network element, which can then further resolve the ICI into data that is usable by the mobile device; or might be data returned to the mobile device by the network element upon receiving an ICI from the mobile device. When an image of a mobile code or an ICI is stored on the mobile device, the image or ICI might be transmitted to a network element for conversion into usable data at a time later than the time of the storage. Hereinafter, the term "mobile code-related data" will be used to refer to an image of a mobile code and/or to the resolved content derived from the image of the mobile code.

The capability to store mobile code-related data might be particularly helpful in various circumstances such as in the case of mobile code-related data that uses the indirect mode of symbology resolution. For example, a mobile device user who is in a location that has no wireless telecommunications coverage might wish to read a mobile code, but the user would not be able to connect to the network element to which the mobile device sends the ICI and from which the mobile device receives data. Previously, if the mobile code used the indirect mode, the mobile code could not be resolved into useful data in such a case. When the embodiments of the present disclosure are implemented, however, the image of the mobile code or the ICI resolved from the image could be stored on the mobile device. When the user enters a location where wireless telecommunications coverage is available, the image or the ICI could be transmitted (e.g., without user intervention) to the network element, and the network element could return useful data to the mobile device.

While storage of mobile code-related data may be useful for indirectly coded data, storage could also occur for mobile code-related data that uses the direct mode of symbology resolution, and the embodiments described herein can apply to both modes of symbology resolution. For example, in the direct mode, the capability to store mobile code-related data would be useful to ensure that stored data can be retrieved from a given storage area or application and not by the invoked application used to display the resolved content. A coupon might be displayed within a browser, while its storage could be maintained in the barcode storage area accessible by the barcode reader. This would allow a user to check all barcodes stored more easily than by verifying multiple invoked applications.

In an embodiment, the entity that provides the data that is encoded in or derived from a mobile code can specify whether or not that data should be made available for storage on mobile devices and for what period of time the data should be available. For example, there may be data that the content provider wishes to make available to users only one time and/or only for a limited length of time (e.g. a coupon might be intended for use only once and/or only within a narrow time frame). When such data is encoded in or can be derived from a mobile code, the content provider might specify that the image of the mobile code or data derived from the image should be prohibited from being stored on a mobile device. For other data, the content provider might specify that storage of the image of the mobile code or data derived from the image is allowed.

In an embodiment, a mobile code is decoded into a data format which includes fields related to the storage of mobile codes. In the simplest case, whether or not storage of mobile code-related data is allowed is indicated by a single field in the data format. The field may take a Boolean variable or some other type of variable that can take on one of a plurality of values. One value of the variable indicates that storage is allowed, and another value of the variable indicates that storage is not allowed. As will be described further below, the fields related to the storage could be multiple and could take different forms in order to enable or disable the storage of the mobile code image and/or the resolved content or could relate to a period of time that storage is allowed (e.g., correspond to the content validity). Thus, storage could be dependent upon some conditions or other action fields associated with a mobile code.

An additional field might be included in the data format to allow a human-readable, user-friendly name or other text to be associated with stored mobile code-related data. If mobile code-related data is stored in a mobile device in a form, such as an image of a mobile code or an ICI, that does not provide directly usable information to the user of the mobile device, the user might not recall why the data was stored. Continuing the example mentioned above, a user in a location without wireless telecommunications coverage might wish to store a mobile code in a mobile device for transmission to a network element upon re-entering a coverage area. If a long time passes between the time of storage and the time of transmission, and/or if a large number of data items are stored, the user might forget the reason for storing the mobile code-related data or might forget what the mobile code-related data pertains to.

In an embodiment, the content provider can provide mobile code-related data with a name or other text that is readily recognizable and meaningful to a mobile device user. This human-readable, user-friendly name or other text can then be stored with the mobile code-related data to assist the user in remembering what the mobile code-related data pertains to. The content provider might include the user-friendly name in a text-based field that is included in the data format.

For example, a coupon for a shoe store might be encoded in a mobile code that is included in a printed advertisement for the store. If a user scans the mobile code with a mobile device, the image of the mobile code might be stored in the mobile device along with a name such as "shoe store coupon". Alternatively, the image of the mobile code might be resolved into an ICI associated with the coupon, and the ICI might be stored with a name such as "shoe store coupon". If the user retrieves the image of the mobile code or the ICI, the stored name might be displayed to remind the user of the purpose of the stored data.

Further to the example above, the ICI may correspond over time to different resolved content. Hence, the shoe store coupon could in fact correspond six months later to a purse store coupon (e.g., the shoe store owner opens a handbag store). In that case, the storage data associated with the ICI can specify how long the ICI should be stored. The ICI with associated text "shoe store coupon" would then be deleted from the storage after the validity period has passed and before the text "shoe store coupon" becomes irrelevant.

In an embodiment, another text-based field can be included in a mobile code data format to specify an action that is to be taken when the content in the mobile code is resolved. The content provider might specify an action that is appropriate for the type of content in the mobile code. For example, if the resolved content is a Uniform Resource Locator (URL) for a web site, the text in the action field could cause a default or specified web browser to open on the mobile device that read the mobile code such that the browser can navigate to the web site associated with the URL. As other examples, if the resolved content is an electronic business card, an address book application might be opened, or if the resolved content is an email address, an email application might be opened.

Other fields that might be resolved from a mobile code can indicate which aspects of mobile code-related data can be stored. One field might indicate whether or not an image of a mobile code can be stored, another field might indicate whether or not an ICI resolved from a mobile code can be stored, and another field might indicate whether or not a URL resolved from a mobile code can be stored. For each stored item, there could be an indication of a time period for which the item can be stored.

Another field or group of fields of data that might be resolved from a mobile code can indicate when storage of an item of mobile code-related data can take place. One field might specify whether or not an item of mobile code-related data can be stored before the resolution of an image into resolved content, another field might specify whether or not an item of mobile code-related data can be stored until it is resolved, another field might specify whether or not an item of mobile code-related data can be stored after resolution, and another field might specify whether or not an item of mobile code-related data can be stored if the item cannot be resolved.

In an alternative embodiment, instead of a data field that specifies whether or not storage of mobile code-related data is allowed, a structure of one or more fields or values can be provided to specify one or more actions that might be taken with regard to the storage of mobile code-related data. A first action might be specified by a content provider to be an action that is appropriate for the type of content encoded in a mobile code. For example, if the content is a URL for a web site, the first action could be the opening of a web browser on the mobile device that read the mobile code. If the content is an electronic business card, an address book application might be opened, if the content is an email address, an email application might be opened, and so on.

The content provider might specify a second action that indicates whether or not the mobile code-related data is to be stored and the conditions for storage. The second action may be contingent on the successful completion of the first action. In some cases, the content provider may specify that the second action should occur automatically based on the status of the first action. For example, if the first action is to connect to a URL resolved from a mobile code, but the mobile device is out of coverage, the content provider may specify that the second action should be that the mobile device should store the URL and connect or prompt the user when coverage is available. Alternatively, the mobile device user may be allowed to choose whether or not the second action should occur. For instance, if the first action is to connect to a URL and download a coupon, but the mobile device is currently out of coverage, the user may know that the coupon will not be useful later when the mobile device returns to a covered area. In such a case, the user may be prompted for input or otherwise choose not to perform the second action of storing the image of the mobile code for later resolution into the coupon.

When this alternative, action-based arrangement is implemented, one or more of the additional data fields described above may also be included in the data format. For example, a user-friendly name could be assigned to the mobile code-related data; the aspects of the mobile code-related data to be stored, such as the symbol/image and/or the resolved content, might be specified; and the time when storage of an item of mobile code-related data can occur, such as before, until, or after resolution, might be specified.

FIG. 1 illustrates an embodiment of a mobile device 110 that includes a barcode reader 120. The barcode reader 120 is capable of processing an image of a mobile code 140 and resolving the data encoded in the mobile code 140 into usable data. The mobile code 140 may be printed on any printable medium, printed medium, printable matter, or printed matter. These terms can be used interchangeably herein.

In an embodiment, the mobile code 140 includes storage-related data 150. It should be understood that the barcode 140 shown in FIG. 1 is an idealized representation meant to depict a barcode and its encoded data as generically as possible. Thus, while the storage-related data 150 is depicted as a discrete region within the mobile code 140, it should be understood that the storage-related data 150 would not necessarily be confined to a specific area within the mobile code 140, but might be interspersed among other content in the mobile code 140.

The storage-related data 150 might include a field that specifies whether or not the mobile code 140 or data derived from the mobile code 140 is allowed to be stored on the mobile device 110 (e.g., in a storage location 130). The storage-related data 150 might also include a field that contains a user-friendly and/or human-readable name for the mobile code 140 or data derived from the mobile code 140. Alternatively the user friendly and/or human-readable name can be retrieved from a mobile code-related data field. Another field in the storage-related data 150 might specify an action to be taken when the mobile code 140 is resolved or the conditions under which storage should apply. The storage-related data 150 might also include other fields as described above. Again, it should be understood that these fields are not necessarily stored together in a single location and are not necessarily components in a single entity that is referred to as "storage-related data". For example, any one or more of the fields that specify whether storage is allowed, the user-friendly name, and the action to be taken when the mobile code 140 is resolved could be stored in the storage-related data 150 or elsewhere in the mobile code 140.

The barcode reader 120 can read the data encoded in the mobile code 140, including the storage-related data 150. If the storage-related data 150 specifies that the mobile code 140 or data derived from the mobile code 140 can be stored on the mobile device 110, the barcode reader 120 might store the mobile code 140 or the data derived from the mobile code 140 in the storage location 130 within the mobile device 110. The storage location 130 might be a component of the mobile device 110, of the barcode reader 120, of an application associated with the barcode reader 120, or of some other application or system on the mobile device 110 such as memory or some other data storage system. It should be noted that if the barcode reader is invoked from an application (e.g., camera, browser, email client, etc.), the barcode reader could pass the storage field values to the application.

A user of the mobile device 110 might have an option or be prompted to choose the storage location 130. For example, if the image of the mobile code 140 is to be stored, the user might choose to store the image in a location with other picture files, if a URL derived from the mobile code 140 is to be stored, the user might choose to store the URL for example as a bookmark in a web browser-associated memory, and so on. Alternatively, the user might choose to store all mobile code-related data in a single storage location 130. The user might also have the capability to modify a portion of the data resolved from the mobile code 140. For example, the user might change the user-friendly name that the content provider assigned to the mobile code 140 or to data that can be derived from the mobile code 140.

Figure 2:
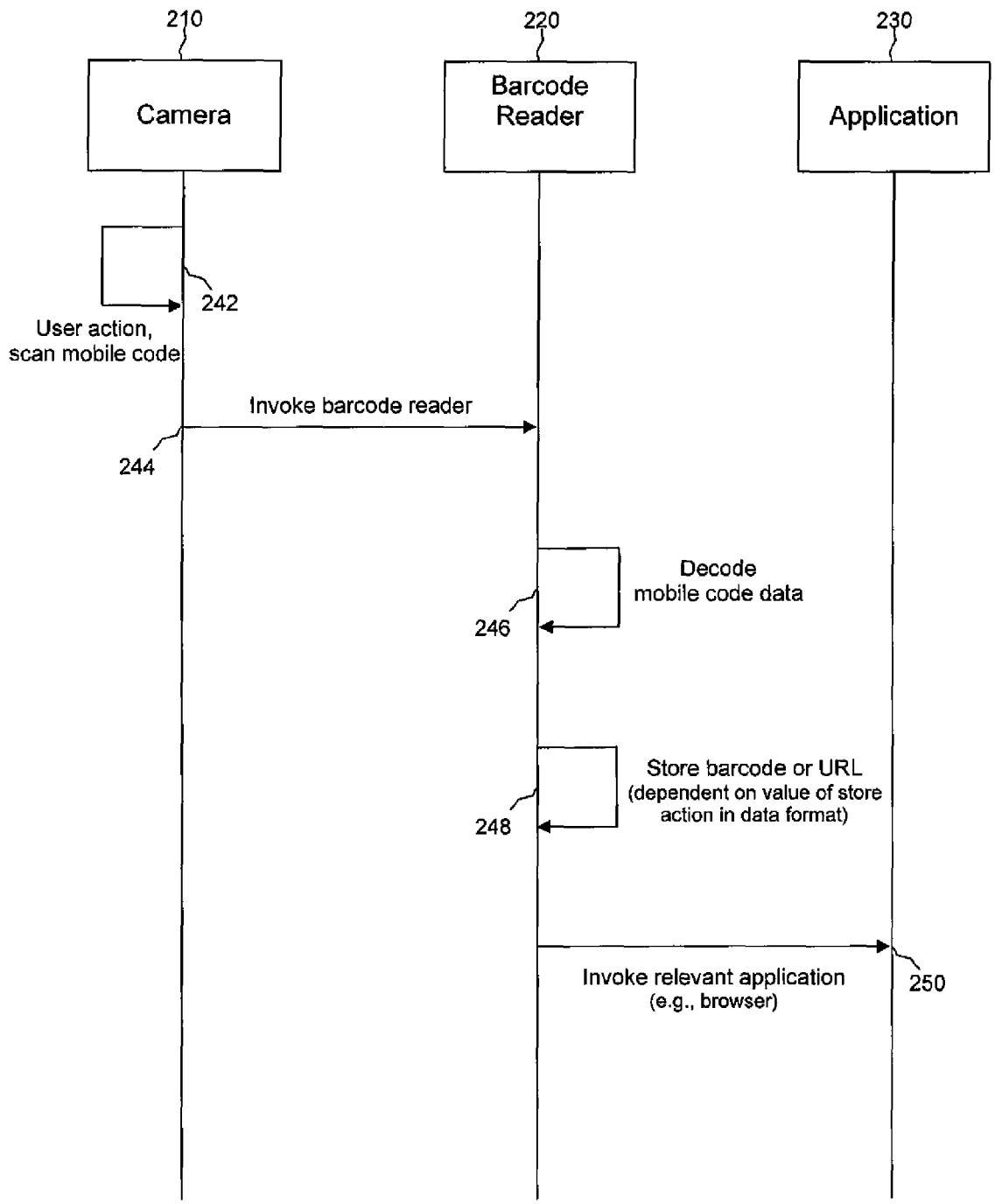
FIG. 2 illustrates an example method for storing mobile code-related data that uses the direct mode of symbology resolution according to an embodiment of the disclosure.

FIG. 2 illustrates an embodiment of a method for storing mobile code-related data that uses the direct mode of symbology resolution. In this case, a mobile device has a separate camera portion 210 and barcode reader portion 220. At event 242, the camera 210 scans a mobile code, for example according to an input or action by a user of the mobile device. At event 244, the camera 210 sends the scanned image to the barcode reader 220. At event 246, the barcode reader 220 decodes the mobile code symbology. At event 248, dependent on the value of a store action field in the data format of the mobile code, the barcode reader 220 might store an image of the mobile code, a URL or URI derived from the mobile code, or other data (e.g., human-readable text such as an advertisement) derived from the mobile code. Additionally, the storage may be valid for a given period of time. At event 250, the barcode reader 220 invokes a relevant application 230. For example, if a URL was derived from the mobile code, a web browser might be invoked. Additionally, at event 250, the barcode reader, when invoking a relevant application 230, may also pass storage field values and an associated friendly, human-readable name to the application 230. The application 230 might be any application on the device that may be used to invoke the barcode reader, such as, but not limited to, a camera, a web browser, an email application, a calendar, an address book, and an RSS feed reader.

Figure 3:
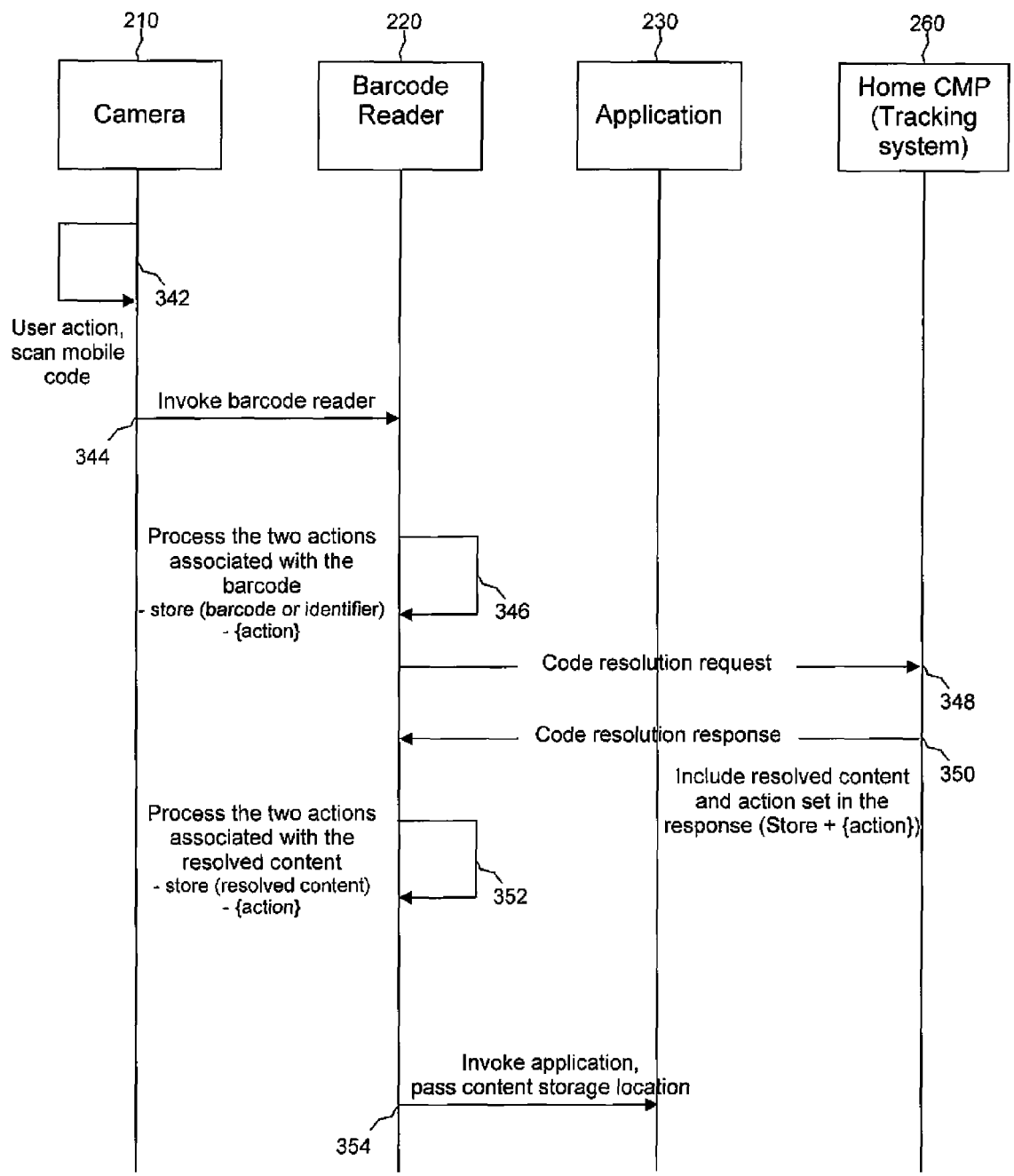
FIG. 3 illustrates an example method for storing mobile code-related data that uses the indirect mode of symbology resolution according to an embodiment of the disclosure.

FIG. 3 illustrates an embodiment of a method for storing mobile code-related data that uses the indirect mode of symbology resolution. In this case, in addition to the camera 210, the barcode reader 220, and the application 230, a tracking system at a home content management platform (CMP) or home code clearing house (CCH) 260 is present. The home CMP or CCH 260 is capable of receiving an ICI from the barcode reader 220 and returning data derived from the ICI to the barcode reader 220.

At event 342, the camera 210 scans a mobile code. At event 344, the camera 210 sends the scanned image to the barcode reader 220. At event 346, the barcode reader 220 processes at least one of two actions associated with the mobile code. That is, the barcode reader 220 might store an image of the mobile code or an ICI derived from the mobile code and/or might perform an action associated with the mobile code. It should be understood that the storage indicator and/or value at step 346 might not be present. At event 348, the barcode reader 220 sends a code resolution request containing an ICI to the home CMP or CCH 260. At event 350, the home CMP or CCH 260 sends the barcode reader 220 a code resolution response containing the resolved content and information associated with the ICI. The code resolution response includes an action set that is to be performed by the barcode reader 220 and that might include an indicator for enabling or disabling storing resolved content and/or some other action associated with the resolved content (such as "invoke calendar application"). The validity period of the storage might be returned as well by the home CMP 260 as part of the mobile code-related data.

At event 352, the barcode reader 220 processes at least one of the two actions associated with the resolved content. That is, the barcode reader 220 might store the resolved content and/or might perform an action associated with the resolved content. At event 354, the barcode reader 220 invokes the application 230. As part of the invocation, the barcode reader 220 might inform the application 230 of the storage location of the content that was resolved from the mobile code. Alternatively, as part of the invocation, the barcode reader 220 might communicate to the application 230 the content that was resolved from the mobile code, potentially along with the storage value and user friendly/human readable name.

Figure 4:
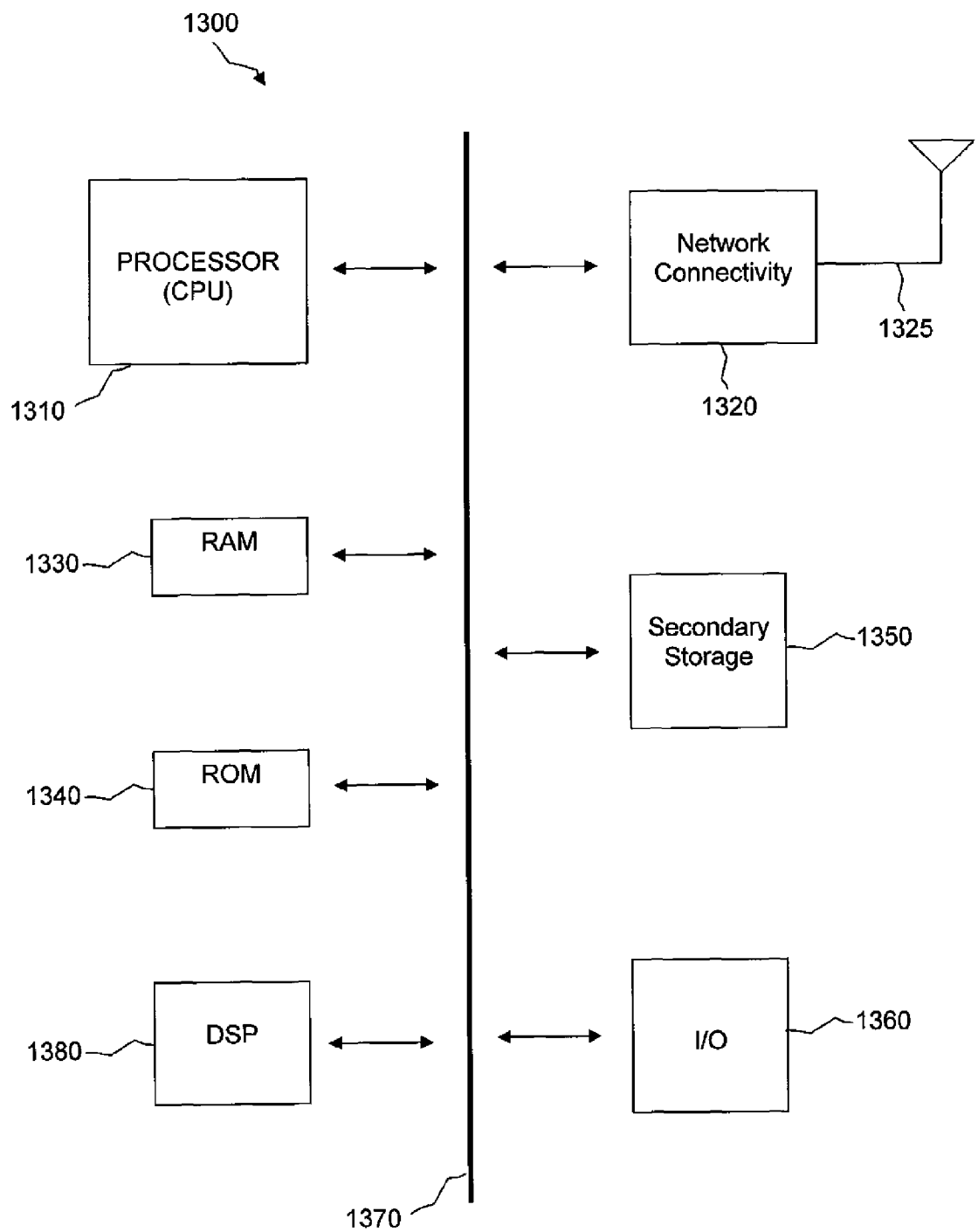
FIG. 4 illustrates a processor and related components suitable for implementing the several embodiments of the present disclosure.

The mobile device 110 and other components described above might include a processing component that is capable of executing instructions related to the actions described above. FIG. 4 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1380. Although the DSP 1380 is shown as a separate component, the DSP 1380 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information. The network connectivity devices 1320 might also include one or more transceiver components 1325 capable of transmitting and/or receiving data wirelessly.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1325 might be considered to be a component of the I/O devices 1360 instead of or in addition to being a component of the network connectivity devices 1320.

In an embodiment, a method is provided for storing mobile code-related data on a mobile device. The method includes a mobile code reader processing a mobile code, wherein storage-related data derived from the mobile code specifies whether at least a portion of the mobile code-related data is allowed to be stored. The method further includes the mobile device selectively storing the at least a portion of the mobile code-related data based on the storage-related data.

In another embodiment, a mobile device is provided. The mobile device includes a barcode reader configured to process an image of a mobile code, wherein storage-related data derived from the mobile code specifies whether at least a portion of data related to the mobile code is allowed to be stored on the mobile device. The mobile device further includes a processor configured to cause selective storage of the at least a portion of the mobile code-related data in a storage location in the mobile device based on the storage-related data.

In another embodiment, a printable medium is provided. The printable medium bears a barcode that is configured such that, when read by a barcode reader, the barcode yields at least one of computer-readable instructions and/or data causing selective storage of at least a portion of information related to the barcode.

In another embodiment, a computer-readable medium having stored thereon a data structure is provided. The computer-readable medium comprises a first field specifying whether at least one of a mobile code image and a mobile-code-related data is allowed to be stored. The computer-readable medium further comprises a second field that includes a human-readable name related to the at least one of the mobile code image and the mobile code-related data that is allowed to be stored.

Incorporated herein by reference are: OMA White Paper on Mobile Codes, Approved 24 Oct. 2008, OMA-WP-Mobile Codes-20081020-A; and CTIA Wireless Internet Caucus, Camera-Phone Based Barcode Scanning, CTIA Code Scan Action Team, White Paper, Sep. 9, 2008.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for storing mobile code-related data on a mobile device, comprising:
    a mobile code reader processing a mobile code, wherein storage-related data derived from the mobile code specifies whether at least a portion of the mobile code-related data is allowed to be stored, and wherein the mobile code-related data is an image of the mobile code or resolved content derived from the mobile code; and
    the mobile device selectively storing the at least a portion of the mobile code-related data based on the storage-related data,
    wherein the resolved content is at least one of:
        data in a form that will be used by the mobile device when a direct mode of symbology resolution is used;
        an indirect code identifier (ICI) that is transmitted to a network element when an indirect mode of symbology resolution is used; and
        data received by the mobile device from the network element subsequent to transmission of the ICI to the network element when the indirect mode of symbology resolution is used.

2. The method of claim 1, wherein the storage-related data further defines a validity period for the storage of the at least a portion of the mobile code-related data.

3. The method of claim 1, wherein the storage-related data is one of:
    encoded in and resolved from the mobile code; and
    retrieved by the mobile device from a network element based on data resolved from the mobile code.

4. The method of claim 1, wherein the mobile code reader invokes an application that uses the resolved content and the mobile code reader provides the storage-related data to the application.

5. The method of claim 1, wherein a provider of the mobile code directs that at least a portion of the mobile code-related data is allowed to be stored.

6. The method of claim 1, wherein the storage-related data follows a data format that is one of:
    XML;
    a hierarchical format;
    a structured format and
    a message format.

7. The method of claim 6, wherein the data format includes data in addition to the storage-related data.

8. The method of claim 7, wherein the data format further includes at least one field that contains a human-readable name for at least the storable portion of the mobile code-related data.

9. The method of claim 7, wherein the data format further includes at least one field that specifies a condition when storage of an item of mobile code-related data can occur, the condition being at least one of:
    before resolution of the image of the mobile code into resolved content;
    until resolution of the image of the mobile code into resolved content; and
    after resolution of the image of the mobile code into resolved content.

10. The method of claim 7, wherein the data format further includes at least one field that specifies whether an item of mobile code-related data can be stored if the item cannot be resolved.

11. The method of claim 7, wherein the storing of at least a portion of the mobile code-related data is a second action specified in a secondary field of the data format, the performing of the second action being contingent on successful completion of a first action specified in a first field of the data format.

12. A mobile device, comprising:
a barcode reader configured to process an image of a mobile code, wherein storage-related data derived from the mobile code specifies whether at least a portion of data related to the mobile code is allowed to be stored on the mobile device; and
a processor configured to cause selective storage of the at least a portion of the mobile code-related data in a storage location in the mobile device based on the storage-related data, wherein the mobile code-related data is an image of the mobile code or resolved content derived from the image of the mobile code, and wherein the resolved content is at least one of:
data in a form that will be used by the mobile device when a direct mode of symbology resolution is used;
an indirect code identifier (ICI) that is transmitted to a network element when an indirect mode of symbology resolution is used; and
data received by the mobile device from the network element subsequent to transmission of the ICI to the network element when the indirect mode of symbology resolution is used.

13. The mobile device of claim 12, wherein the storage-related data further defines a validity period for the storage of the at least a portion of the mobile code-related data.

14. The mobile device of claim 12, wherein the storage-related data is one of:
encoded in and resolved from the mobile code; and
retrieved by the mobile device from a network element based on data resolved from the mobile code.

15. The mobile device of claim 12, wherein the barcode reader invokes an application that uses the resolved content and the barcode reader provides the storage-related data to the application.

16. The mobile device of claim 12, wherein a provider of the mobile code specifies that at least a portion of the mobile code-related data is allowed to be stored.

17. The mobile device of claim 12, wherein the storage-related data follows a data format that is one of:
XML;
a hierarchical format;
a structured format; and
a message format.

18. The mobile device of claim 17, wherein the data format includes data in addition to the storage-related data.

19. The mobile device of claim 18, wherein the data format further includes at least one field that contains a human-readable name for at least the storable portion of the image of the mobile code-related data.

20. The mobile device of claim 18, wherein the data format further includes at least one field that specifies a time when storage of an item of mobile code-related data can occur, the time being at least one of:
before resolution of the image of the mobile code into resolved content;
until resolution of the image of the mobile code into resolved content; and
after resolution of the image of the mobile code into resolved content.

21. The mobile device of claim 18, wherein the data format further includes at least one field that specifies whether an item of mobile code-related data can be stored if the item cannot be resolved.

22. The mobile device of claim 18, wherein the storing of at least a portion of the mobile code-related data is a second action specified in a second field of the data format, the performing of the second action being contingent on successful completion of a first action specified in a first field of the data format.

* * * * *